(12) United States Patent
Ogura

(10) Patent No.: US 6,543,754 B2
(45) Date of Patent: Apr. 8, 2003

(54) AIR SPRING

(75) Inventor: Hideaki Ogura, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 09/858,662

(22) Filed: May 17, 2001

(65) Prior Publication Data

US 2002/0008339 A1 Jan. 24, 2002

(30) Foreign Application Priority Data

May 22, 2000 (JP) .......................................... 2000-149545
Jul. 31, 2000 (JP) .......................................... 2000-230307

(51) Int. Cl.[7] .............................. F16F 9/342; F16F 5/00
(52) U.S. Cl. ................................ 267/64.18; 267/64.22; 267/64.26; 267/64.16; 188/317
(58) Field of Search .......................... 267/64.11, 64.12, 267/64.15, 64.16, 64.25, 64.26, 120, 130, 64.18, 64.22, 118, 119, 124, 126, 127, 131, 132; 188/282.2, 282.4, 313, 316, 317, 319.1, 319.2, 322.13, 282.1, 297, 322.15; 16/49, 66, 84

(56) References Cited

U.S. PATENT DOCUMENTS

| | | | | |
|---|---|---|---|---|
| 3,202,413 A | * | 8/1965 | Colmerauer | 267/64.11 |
| 3,856,287 A | * | 12/1974 | Freitag | 267/64.11 |
| 4,944,705 A | * | 7/1990 | Kashima et al. | 267/64.15 |
| 5,275,264 A | * | 1/1994 | Isella | 267/64.15 |
| 5,681,234 A | * | 10/1997 | Ethington | 280/261 |
| 5,775,677 A | * | 7/1998 | Englund | 267/64.26 |
| 5,971,116 A | * | 10/1999 | Franklin | 188/282.2 |

* cited by examiner

Primary Examiner—Jack Lavinder
Assistant Examiner—Thomas J. Williams
(74) Attorney, Agent, or Firm—Rabin & Berdo, PC

(57) ABSTRACT

Spring characteristics are switched in response to running conditions or use requirements of a bicycle in order to improve riding comfort and vehicle performance. A rod 2 is connected to a piston 3 which slides in a cylinder 1, a piston-side chamber (A) and a rod-side chamber (B) are partitioned in the cylinder 1 by the piston 3 and compressed air fills the two chambers, a passage 4 which connects the two chambers is opened and closed by a switch valve 5, the cylinder 1 is connected to the vehicle wheels and the piston rod 2 is connected to the vehicle body, the piston 3 displaces in response to vibration applied to the vehicle body in order to absorb vibrations.

6 Claims, 7 Drawing Sheets

AIR SPRING

FIELD OF THE INVENTION

This invention relates to an air spring which is disposed between a vehicle wheel and the body of a two-wheeled vehicle in order to absorb vibration.

BACKGROUND OF THE INVENTION

The provision of an air spring between a vehicle wheel and vehicle body in modern bicycles improves riding comfort by absorbing road surface vibrations when the bicycle is running.

Various types of air springs have been proposed and an example thereof is shown in FIG. 9.

This type of air spring comprises an air chamber A which is partitioned by a piston 103 in a cylinder 101 and an air chamber B in a tank 110 which is separated from cylinder 101. The air chambers A and B which are filled with pressurized air connected by a passage 108. The air chambers A, B are connected and disconnected as a result of switching operations performed by a switch valve 109 which is provided in the passage 108 connecting the chambers.

When the air chambers A, B are connected, the effective volume of the air spring is increased with the result that a low spring force is applied. When the air chambers A, B are disconnected, a small effective volume corresponding to only the air chamber a results in a high spring force.

For example, a piston rod 102 is connected to the vehicle wheel and the cylinder 101 is connected to the vehicle body in this air spring. An air chamber C disposed opposite the piston 103 is at atmospheric pressure.

A bicycle comprising an air spring allows the rider to switch the switch valve 109 in order to select a hard ride based on a high spring force or a soft ride based on a low spring force when riding the bicycle.

However a tank 110 which is separate from the cylinder 101 is required in the air spring in order to switch between a high and low spring force. Moreover the capacity of this tank 110 must be large in order to increase the differential variation (width thereof) of the spring force resulting from switching.

As a result, the problem has arisen that the overall size of the spring is increased.

SUMMARY OF THE INVENTION

The object of the present invention is to provide an air spring enabling two clearly distinct spring characteristics in a compact unit.

In order to achieve above the object, the invention provides an air spring for a two-wheeled vehicle, the air spring being disposed between a vehicle body and a vehicle wheel. The air spring comprises a piston which slides in a cylinder member, a rod member which is engaged with the piston, a rod-side air chamber and a piston-side air chamber which are partitioned in the cylinder member by the piston and are filled with compressed air, a passage which connects the two air chambers, and a switch valve which opens and closes the passage.

DESCRIPTION OF THE PREFERRED EMBODIMENTS

Figure 1:
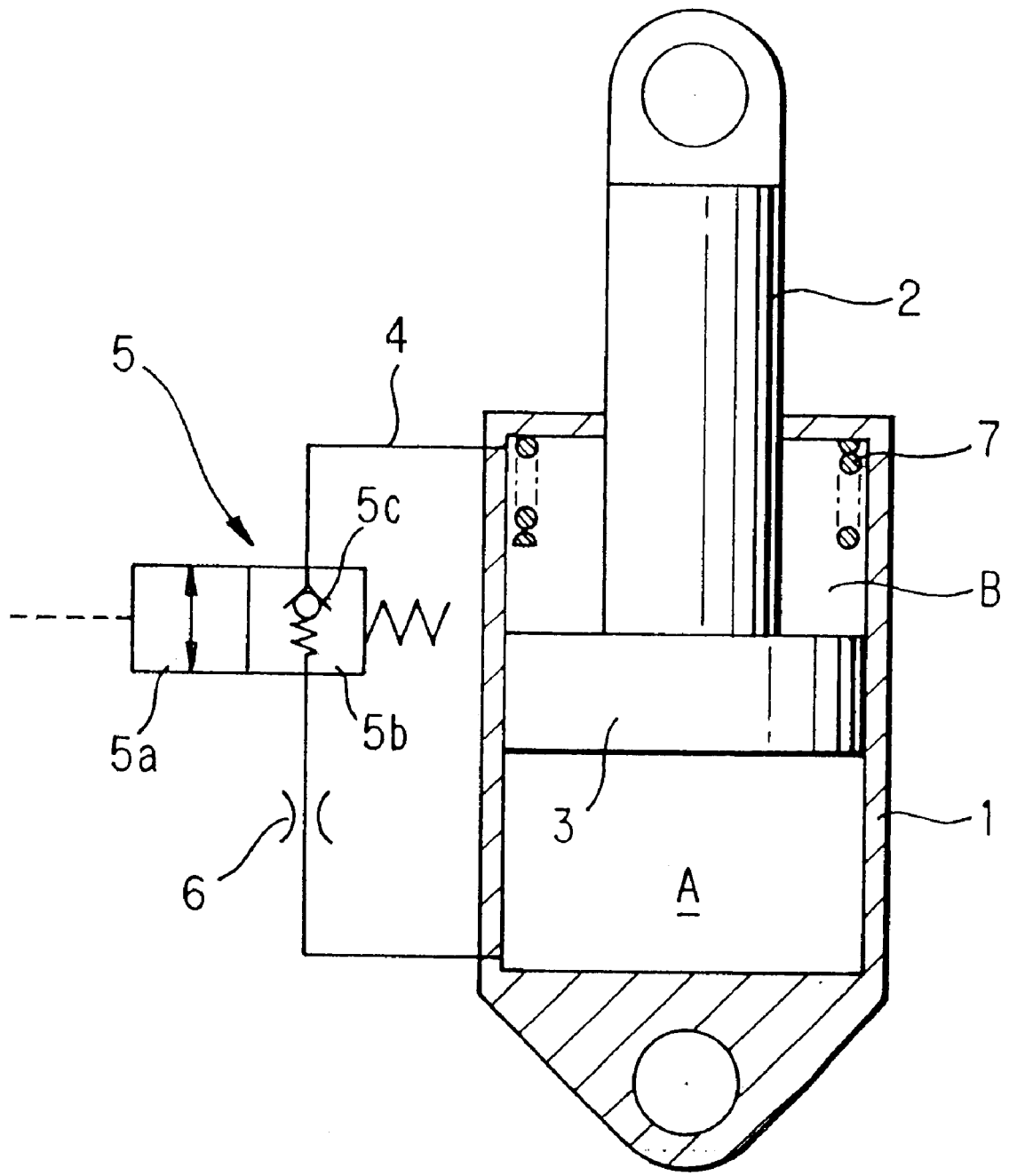
FIG. 1 shows the principle of an air spring according to the present invention.

An embodiment as shown in FIG. 1 will be described below.

An air spring according to the present invention is housed in a bicycle (not shown).

A cylinder 1 for the air spring is connected to a vehicle wheel and a rod 2 which expands and contracts from within the cylinder 1 is connected to the vehicle body.

A piston 3 which is connected to the rod 2 slides in the cylinder 1. An air chamber A and an air chamber B are partitioned on both sides of the piston 3 and the air chambers A, B are filled with pressurized air. Hereafter the air chamber A below the piston 3 will be termed the piston-side air chamber and the air chamber above the piston 3 will be termed the rod-side air chamber.

A connecting passage 4 is provided in order to connect the two air chambers A, B. A switch valve 5 which opens and closes the connecting passage 4 and a throttle (orifice)6 which is disposed in series with the switch valve 5 are provided along the connecting passage 4.

The switch valve 5 is switched by an external operating input between a connecting position 5a which opens the connecting passage 4 and a cut-off position 5b which closes the connecting passage 4 when the operating input above is released. The cut-off position 5b comprises a check valve 5c which prevents the entry of air from the air chamber A to the air chamber B and which allows reverse flow in the reverse direction. As a result however, air flow from air chamber B to air chamber A occurs even in the cut-off position 5b when the pressure of the air chamber B is higher than the air pressure in the air chamber A.

The check valve 5c may be disposed along a bypass passage which bypasses the switch valve 5 switched between an ON and OFF position.

Thus when the rod 2 enters the cylinder 1 as a result of a compressive force, the air spring displays distinct high and low spring forces as described hereafter.

Firstly when the switch valve 5 of the connecting passage 4 is maintained at the cut-off position 5b as shown, only the air chamber A is compressed by the piston 3 descending in the cylinder 1 and a spring force is generated by a repulsive force with respect to air compression.

The amount of air compression is proportional to the pressured surface area and the stroke amount of the piston 3. Since the effective volume at this time is small since only the air chamber A is compressed, the spring force is rapidly increased by increases in the stroke amount.

Figure 2:
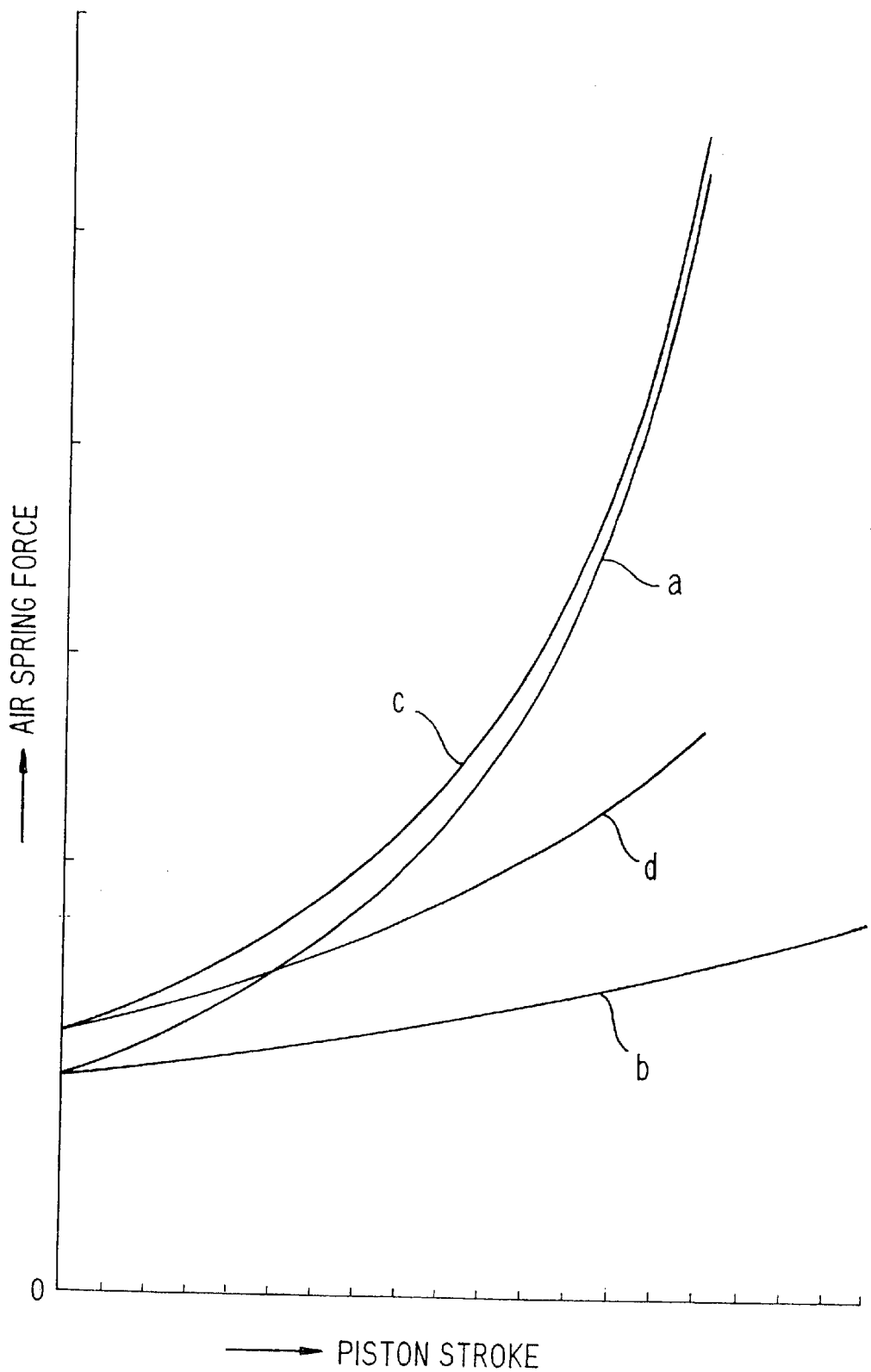
FIG. 2 compares the spring characteristics of a conventional air spring with an air spring according to the present invention.

The spring force characteristics are shown in FIG. 2 at "a".

In contrast when the switch valve 5 is switched to the connecting position 5a, a section of the air in the air chamber A also flows into the air chamber B due to the piston 3 descending in the cylinder 1. As a result, the effective volume of the air spring becomes the total of the capacity of the air chamber A and the air chamber B.

Moreover in the air chambers A and B, only a volume of air is compressed which corresponds to the entry of the piston rod 2 in the cylinder 1.

As a result, in comparison to the cut-off position above, the compression amount of air resulting from the same piston stroke is clearly smaller.

Thus the spring force at this time is a low spring force as shown in FIG. 2 at "b".

Figure 9:
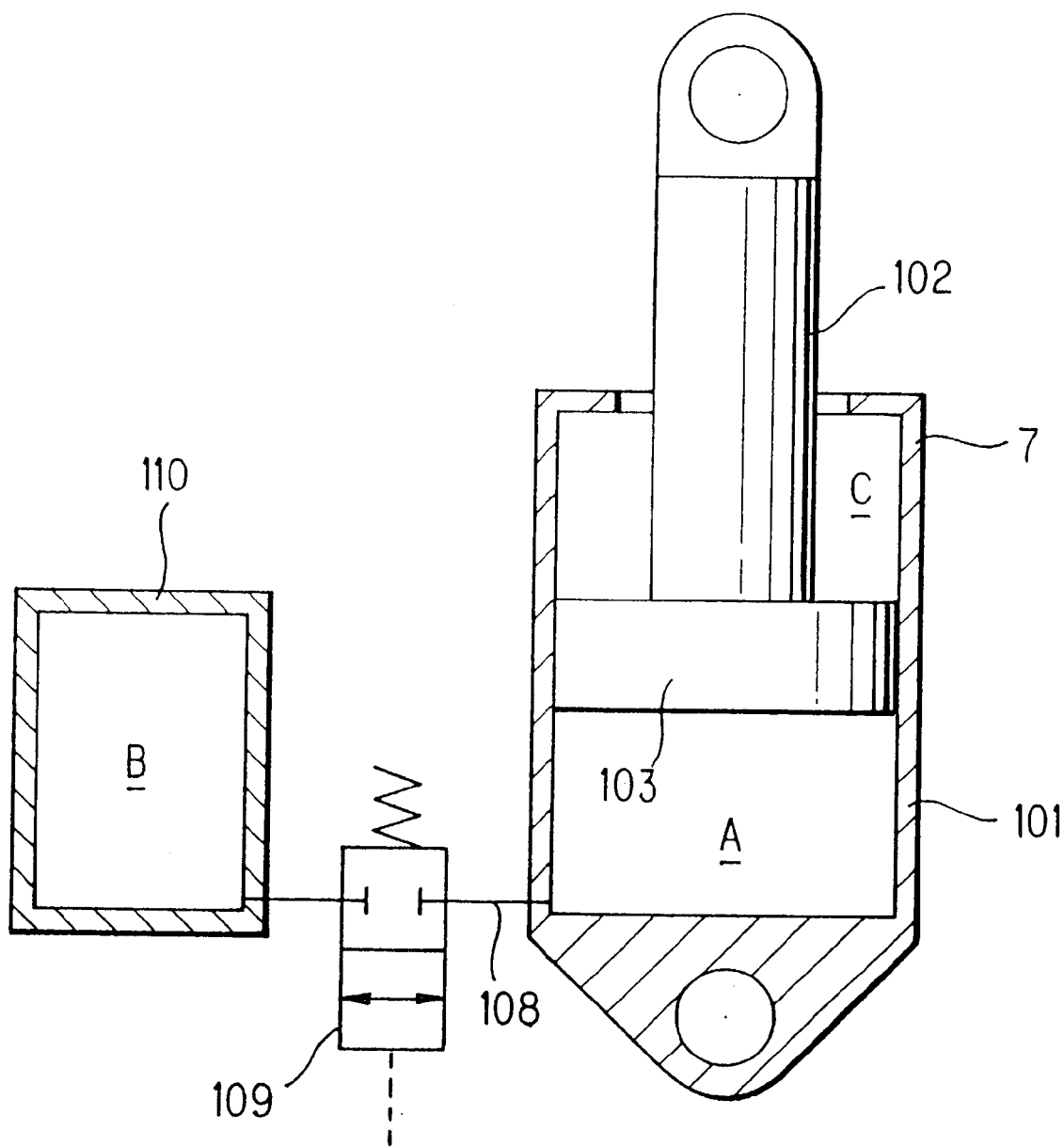
FIG. 9 shows a conventional air spring.

When these high and low spring forces are compared with the spring characteristics of the conventional air spring as shown in FIG. 9, firstly the high spring force at "c" displays approximately the same high spring characteristics if the cross sectional surface area of the piston and the volume of the compressed volume are equal.

However in the present invention, when compression is initiated, although the pressure of the air chamber B is the same as the pressure of the air chamber A, since one air chamber in the conventional example is at atmospheric pressure, the initial compressive pressure is lower to a corresponding degree at "a" in the present invention.

At the low spring force shown at "d", in contrast to the conventional example in which both air chambers A and B are compressed by the pressured cross sectional face of the piston, the chambers A and B are compressed in the present invention in response to the cross sectional area of the piston rod which has a pressured surface area is smaller than the piston. As a result, even when the effective volume is the same, increases in compressive pressure by the same piston stroke are clearly smaller in the present invention and the generated spring force is therefore lower.

Thus in the present invention, when the spring characteristics are switched, it is possible to clearly increase the differential variation (width thereof) of the spring force in comparison to the conventional example. However in the conventional example, the capacity of the tank and the size of the air spring must be greatly increased in order to achieve this type of large differential variation. In the present invention, since the air chamber A and the air chamber B are formed in the cylinder 1, it is not required to provide the tank separately which allows reductions in space required for components.

In the expansion stroke during which the piston rod undergoes maximum expansion, the air chamber B is compressed. If the pressure in the air chamber B at this time is higher than the pressure in the air chamber A, since the check valve 5c is opened even when the switch valve 5 is at the cut-off position, the pressure in the air chamber A equals the pressure of the air chamber B. As a result, when the switch valve 5 is either connected or cut-off, the compressive force is the same at an initial stroke position when the air spring undergoes maximum expansion.

Thus when running off-road, a preferred spring force can be obtained in a bicycle housing an air spring by closing the switch valve 5 to create a high spring force and, when running on-road, a low spring force is created by opening the switch valve 5.

It is often the case that the switch valve 5 is set to be normally closed (normally-closed type) when the bicycle provided with an air spring is set to off-road use. The switch valve 5 is set to be normally open (normally-open type) when the bicycle provided with an air spring is set to on-road use.

When the switch valve 5 is in the connecting position 5a, the throttle 6 which is provided in the connecting passage 4 applies a throttle resistance to the flow of air passing between the air chamber A and the air chamber B. When in the cut-off position 5b, the throttle 6 applied a throttle resistance to the flow of air from the air chamber B to the air chamber A. Therefore a damping force is generated with respect to the repulsive force of the air spring.

As a result, when the switch valve 5 is in the connecting position 5a for a low spring force, that is to say, when set to a soft ride, the throttle 6 displays a large damping force when the air spring undergoes a high speed compression with a large stroke on landing after a bicycle jump for example. Thus it is possible to avoid bottoming of the piston 3 in the air spring.

The air spring has a full rebound spring 7 on the rear face of the piston 3 in FIG. 1, that is to say, on the outer peripheral side of the rod 2 in the air chamber B. When the air spring extends nearly up to maximum extension, the full rebound spring 7 damps the shock of maximum extension on the piston 3.

Figure 3:
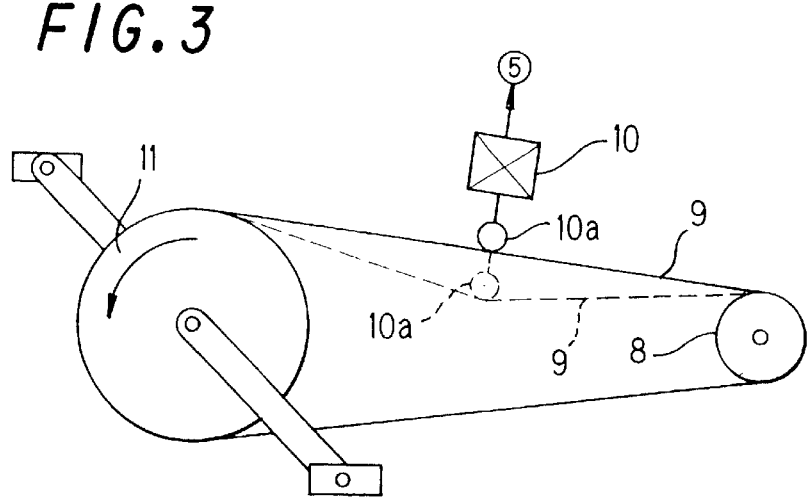
FIG. 3 shows the relationship of a sensor and a drive chain in a bicycle.
Figure 4:
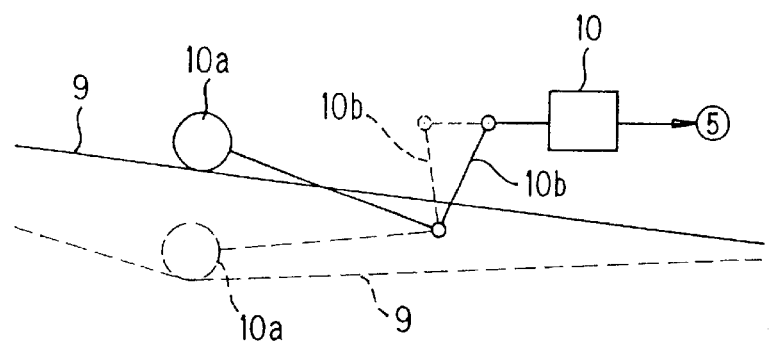
FIG. 4 shows another example of the relationship of a sensor and a drive chain in a bicycle.
Figure 5:
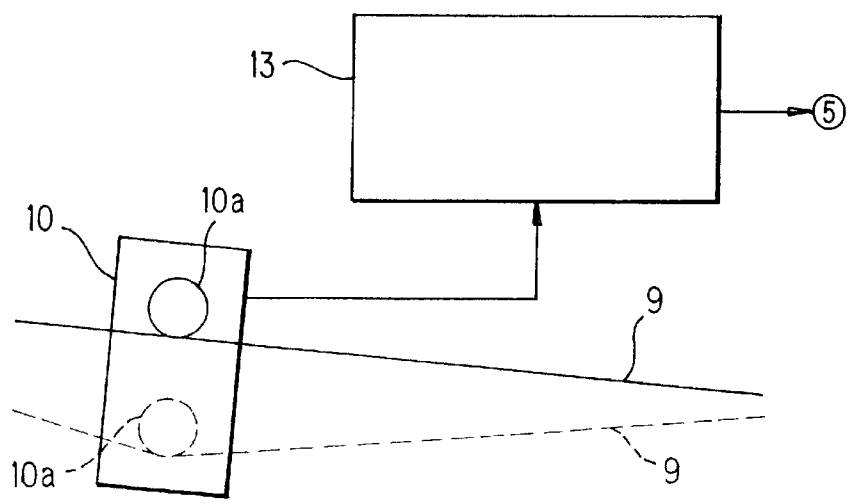
FIG. 5 shows yet another example of the relationship of a sensor and a drive chain in a bicycle.

Although the input of the switch valve 5 may be manually operated by the driver, as shown in the embodiment in FIG. 3 to FIG. 5, the valve 5 is adapted to be switched in response to operational conditions by an external electrical signal.

FIG. 3 shows automatic control of the switch valve 5 based on a detection signal from a sensor 10 which detects strain on a drive chain 9 in the bicycle.

When the air spring is housed by support on the rear wheel side of the bicycle, it is preferred that the air spring generates a high spring force when the rider strongly depresses the pedal during acceleration or start motion of the bicycle,.

A sensor 10 which detects strain (shown by the solid line in the figure) on the drive chain 9 which revolves between the gear 8 of the rear wheel and the crank gear 11 connected to the pedal. The switch valve 5 is switched by input electrical signals as a result of the detection signals from the sensor 10. The spring force of the air spring is increased by the switching operation of the switch valve 5.

When the spring force of the air spring is loose during start motion or acceleration, a supporting force is not easily obtained when strongly depressing the pedal and thus desirable acceleration characteristics are not obtained. However the tension resulting from the downward pressure exerted by the rider is efficiently transmitted to the crank gear 11 and the drive wheels are rotated with high efficiency by increasing the spring force of the air spring in this manner.

When the drive chain 9 is not in under strain, for example when a large drive force is not required during downhill coasting, the drive chain 9 is loose. Thus a detection signal from the sensor 10 is not output and the switch valve 5 is placed in a connection state which results in a low spring force in the air spring. Therefore a setting for a soft ride is possible at this time.

In the arrangement as shown in FIG. 3, an idler pulley 10a comes into the contact for example with the drive chain 9 and when the pulley 10a is shifted by strain on the drive chain 9, this operation is detected by the sensor 10.

In contrast, as shown in FIG. 4, it is possible to adapt the device so that a sensor 10 detects the pulley 10a moving through a stroke via a link 10b.

The embodiment as shown in FIG. 3 can be applied to the situation in which there is sufficient space to dispose the sensor 10 in a orientation which is roughly orthogonal to the drive chain 9. Furthermore the embodiment as shown in FIG. 4 can be applied to the situation in which there is not sufficient space roughly orthogonal to the drive chain 9.

In the embodiment as shown in FIG. 5, the signal from the sensor shown in FIG. 3 or FIG. 4 is input to a controller 13 and is converted to an electrical drive signal therein. The converted signal is output to the switch valve 5.

The air spring in FIG. 1 shows the principle of operation. The detailed structure of the air spring will be described below based on FIG. 6.

Figure 6:
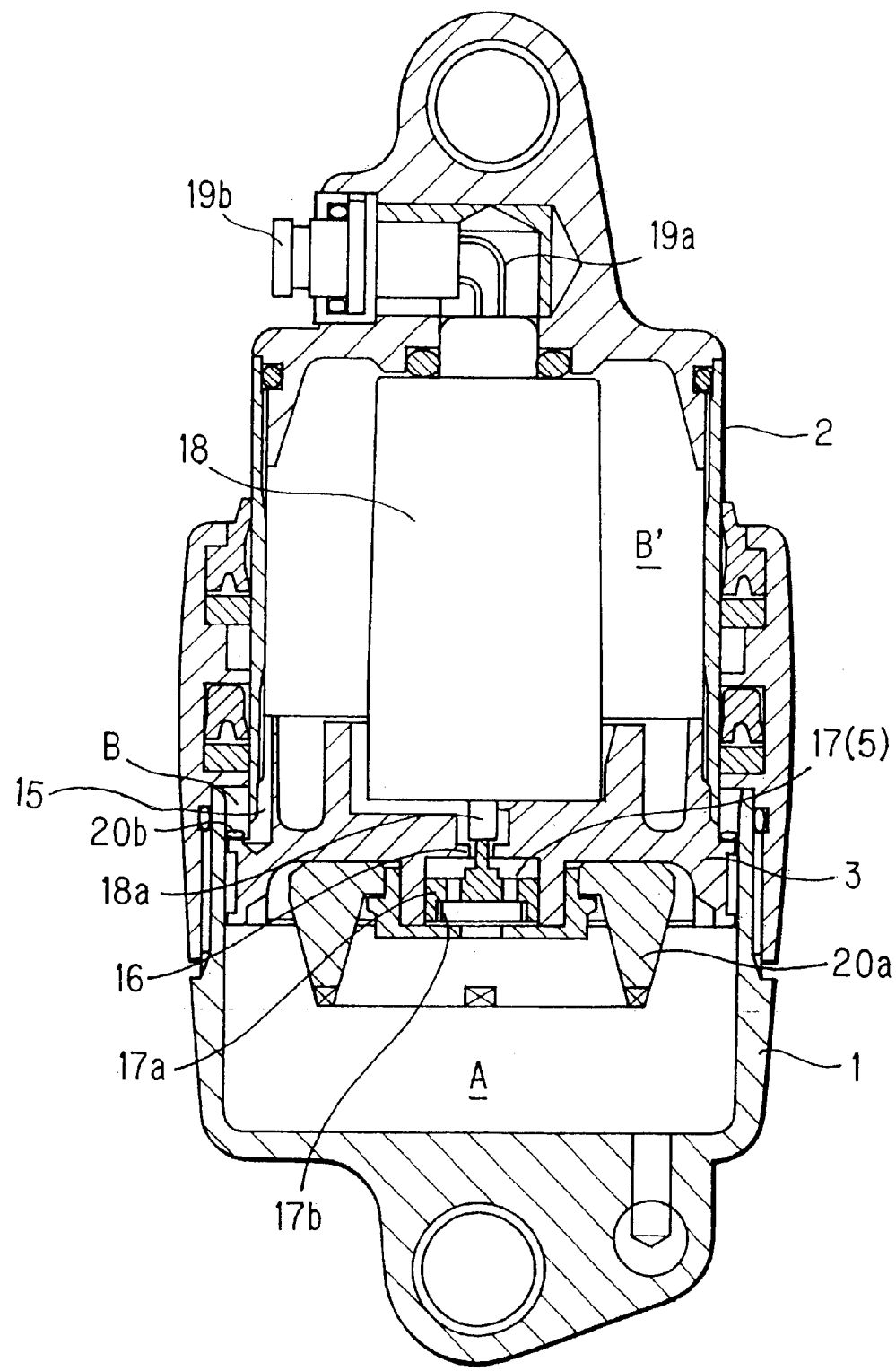
FIG. 6 is a cross sectional view of an embodiment applying an air suspension for a bicycle according to the present invention.

The air spring in FIG. 6 is shown as supporting the rear wheel of the bicycle as a suspension spring. The air spring has a piston 3 which is inserted to slide freely in a cylinder 1 which acts as a member connected on the vehicle wheel. A hollow rod 2 which acts as a member connected to the vehicle body is connected to the piston 3.

An air chamber A and an air chamber B are partitioned in the cylinder 1 by the piston 3. The air chamber B is normally connected with the hollow chamber B' in the rod 2 by a passage 15.

A passage 16 is formed in the piston 3 to connect the air chamber A and the air chamber B with a switch valve 5 is interposed therein. The passage 16 also functions as the orifice 6 in FIG. 1.

The switch valve 5 comprises a check valve 17. A poppet 17a is biased towards closure by the spring 17b. In contrast, an actuator 18 is provided opposite the poppet 17a. When the push rod 18a of the actuator 18 is depressed by the poppet 17a, the check valve 17 is opened as shown in the figure.

When th e check valve 17 is opened, the air chamber A and the air chamber B are connected and the spring force of the air spring is low. When the check valve 17 is closed, only the air chamber A is operated which results in a reduction in the effective volume of the air spring. Therefore the spring force of the air spring can be increased.

An electrical signal is supplied to the actuator 18 from an external controller. In this manner, when the actuator 18 which comprises a motor for example is operated, the push rod 18a is extended and the poppet 17a is depressed.

In this state, the spring force characteristics of the air spring are switched to a low state.

In contrast, when the actuator 18 is not operated, since the poppet 17a is pressed upwardly by the spring 17b and closed, the spring force of the air spring is increased.

When the pressure in the air chamber B is higher than the pressure in the air chamber A such as when the rod 2 has extended, the poppet 17a compresses the spring 17b and the check valve 17 opens and allows air flow.

The actuator 18 is disposed in the rod 2. Since the rod 2 acts as a member with respect to the vehicle body, even when the air spring is expanded, component durability is increased irrespective of vibration or drag from the actuator 18 on the harness 19a or the connector 19b which are connected to the external member (the controller near the vehicle body) from the actuator 18.

An annular bump cushion 20a is provided on an end face near the air chamber A, that is to say, near the pressured face of the piston 3 which comprises the lower end face in the figure. An annular bump cushion 20b is provided which corresponds to a full rebound spring 7 as described above (Refer to FIG. 1) on the end face near the air chamber B, that is to say, on the rear face of the piston 3 which is the upper end face in the figure.

The piston 3 can be prevented from colliding with the cylinder 1 during maximum compression or expansion of the air spring by the provision of the bump cushion 20a and the bump cushion 20b.

Although the air spring according to the present invention was described with reference to use in a bicycle, the air spring may be used in a motor bike. Of course in this event, the effect of the invention is the same as that described above.

The air spring may be housed in the front of the bicycle with the same effect being obtained as that described above.

This embodiment is described with reference to FIG. 7 and FIG. 8.

Figure 7:
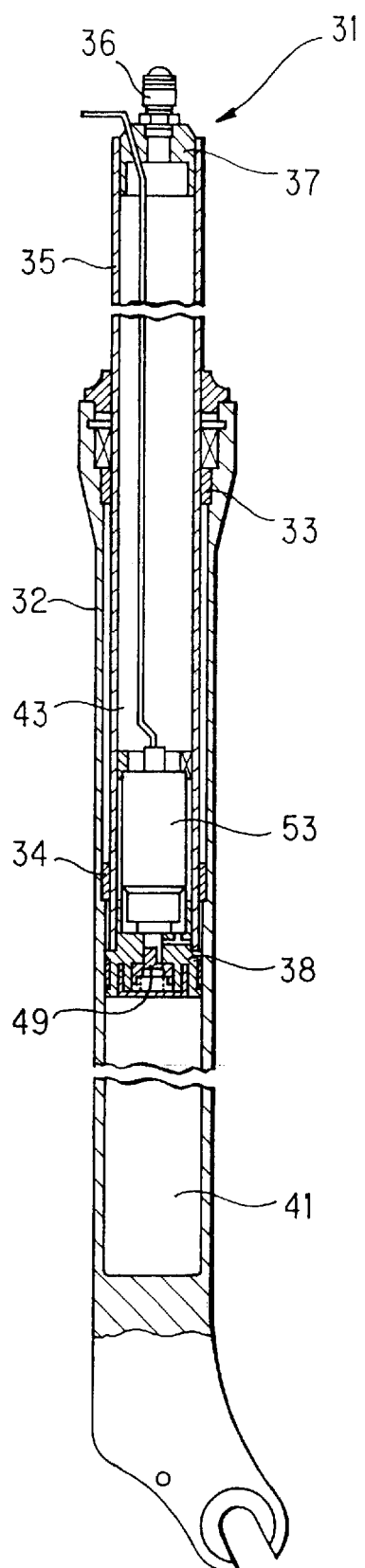
FIG. 7 is a cross sectional view of an embodiment applying a front fork for a bicycle according to the present invention.
Figure 8:
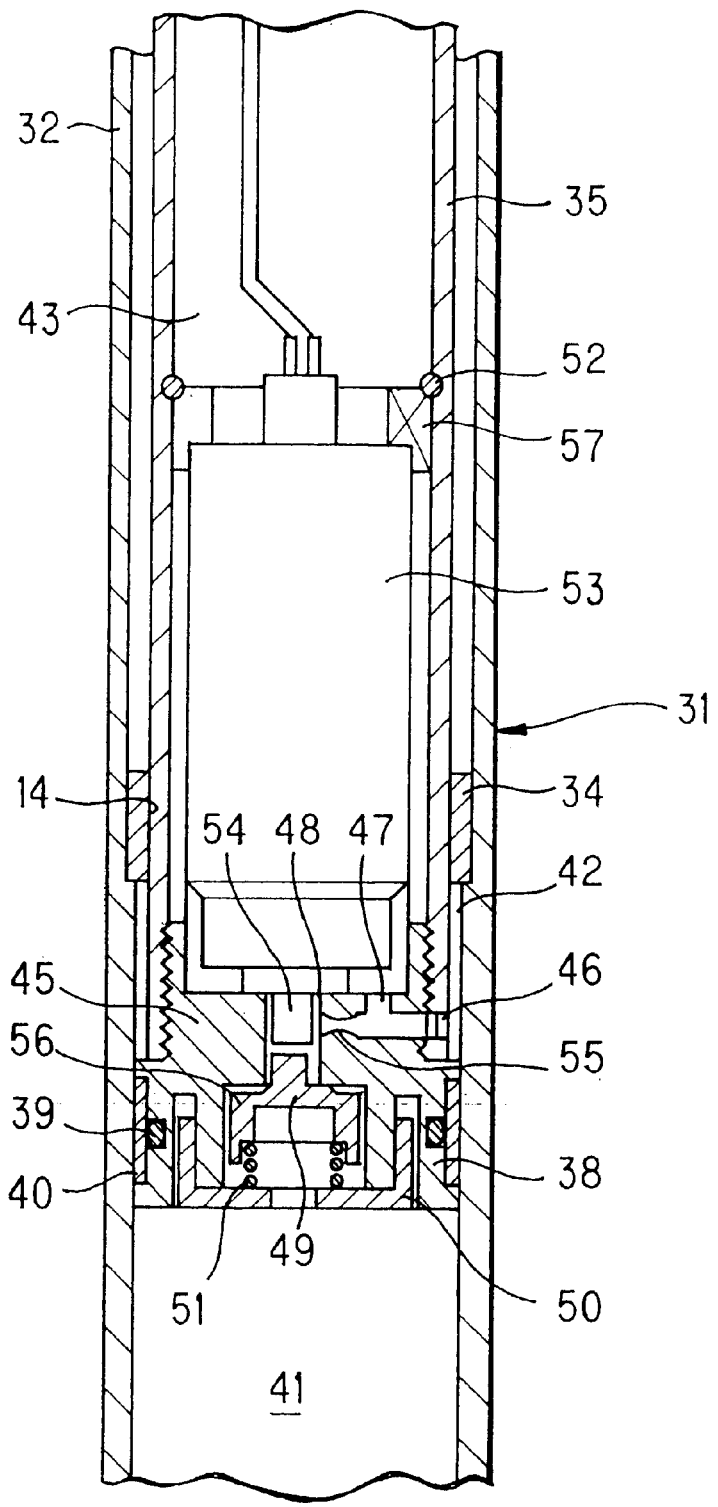
FIG. 8 is an enlarged cross sectional view of a section of FIG. 7.

FIG. 7 shows an expandable support shaft 31 which acts as a front fork for supporting the front wheel and which can be used when applying the present invention to a bicycle or the like. The expandable support shaft 31 may correspond to a combination of left and right shafts used as the expandable support shaft for supporting the front wheel which is used in a normal motor bike. Alternatively a single expandable support shaft 31 may be used as a cantilevered type.

The lower end of the expandable support shaft 31 for supporting the front wheels is provided with an outer tube 32 which supports the front wheels of a bicycle for example. An inner tube 35 is inserted to slide freely through bearings 33, 34 into the interior from an upper end of the outer tube 32. The inner tube 35 is connected to the vehicle body.

A section of the upper end of the inner tube 35 is sealed by a cap 37 which is provided with an air-sealing valve 36. Thus it is possible to input pressurized air into the interior of the expandable support shaft 31 which comprises an outer tube 32 and an inner tube 35 through the air input valve 36.

A piston 38 is mounted which slides on an inner wall of the outer tube 32 on a lower end of the inner tube 35. As shown in FIG. 8, a seal 39 and a piston ring 40 are provided on an outer peripheral face of the piston 38. Although the air sealing characteristics are maintained by the piston ring 40 and the seal 39, the interior of the expandable support shaft 31 partitions an air chamber 41 in the outer tube 32, an air chamber 42 in the inner tube 35 and an air chamber 43 near the inner tube 35.

The air chamber 42 in the inner tube 35 is normally in communication with the air chamber 43 in the inner tube 35 via the through holes 46, 47 provided on the boss 45 which acts as a mounting member for the piston 38 corresponding to the inner tube 35.

A connecting passage 48 is provided in the piston 38 and the boss 45. The connecting passage 48 branches from the through hole 47 and communicates with the air chamber 41 in the outer tube 32. A check valve mechanism 49 is disposed in series with the throttle 55 along the connecting passage 48 and allows airflow only from the air chamber 42 to the air chamber 41 near the outer tube 32.

The check valve mechanism 49 is closed by a return spring 51 which is interposed with the cap 50 which is fitted with the piston 38. The air chambers 42, 43 in the inner tube 35 and near the inner tube 35 are placed in communication with the air chamber 41 in the outer tube 32 by pressing the valve body 56 of the check valve mechanism 49 into an open position against the return spring 51.

An electrical actuator 53 is provided in the interior of the air chamber 43 of the inner tube 35 in order to perform opening and closing operations on the valve body 56 of the check valve mechanism 49 with an externally supplied signal.

The electrical actuator 53 is fixed between a boss 45 of the piston 38 and the support seat 57 which is fixed by a snap ring 52 on the inside of the inner tube 35.

When the electrical actuator 53 is operated, the push rod 54 extends and depresses the valve body 56 of the check valve mechanism 49 in order to forcibly open the valve 56.

When the bicycle is running with the check valve mechanism 49 closed, when a large external force such as the inertia of the load or the upward thrust from the road surface is applied, the extendable support shaft 31 for supporting the front wheels is operated in a compressing direction. Thus the effective volume is comprised by only the air chamber 41 in the outer tube 32. Since the cross sectional volume of the piston 38 comes under pressure, the expandable support shaft 31 generates a large air spring repulsive force and effectively absorbs the inertia or the upward thrust.

When the electrical actuator 53 is operated in response to an external signal, the air chamber 42 and the air chamber 43 in the inner tube 35 increases the overall air chamber capacity by coming into communication with the air chamber 41 in the outer tube 35 since the push rod 54 forcibly presses the check valve mechanism 49 open.

In this state, air in the air chambers 41, 42, 43 is compressed by a pressured surface corresponding to the cross sectional volume of the inner tube 35. As a result, the air spring repulsive force is smaller in comparison to a compression operation with the check valve mechanism 49 closed.

Even when the vehicle is running with the check valve mechanism 49 closed, the air chambers 42, 43 in the inner tube 35 are compressed as the expandable support shaft 31 expands. When the air pressure is greater than the air pressure of the air chamber 41 in the outer tube, the check valve mechanism 49 is opened. As a result, the pressure relationship of the air chamber 41 and the air chambers 42, 43 can be returned automatically to an initial state which thus ensures reliable functioning of the air spring.

Although this has not been described in particular above, when the front wheels are supported by a pair of left and right expandable support shafts 31, one of the expandable support shafts 31 comprises an air spring as described above and the other expandable support shaft is supported by a metallic coil spring. Alternatively a hydraulic oil damping mechanism may be combined with an air pressure support.

The present invention is not limited to the above embodiments and various changes may be made within the technical scope of the invention as understood by a person skilled in the art without departing from the spirit and scope thereof.

What is claimed is:

1. An air spring for a two-wheeled vehicle, the air spring being disposed between a vehicle body and a vehicle wheel, comprising:

a piston which slides in a cylinder member;

a rod member which is engaged with the piston;

a rod-side air chamber and a piston-side air chamber which are partitioned in the cylinder member by the piston and are filled with compressed air;

a passage which connects the two air chambers; and a switch valve which opens and closes the passage;

wherein the switch valve has a connecting position which places the passage in a connecting state, and a cut-off position which places the passage in a cut-off state, the cut-off position having a check valve inserted therein, the check valve allowing a flow of air from the rod-side chamber to the piston-side chamber; and wherein the switch valve is provided in the piston, an actuator which operates the switch valve being mounted inside the rod member, the actuator being operated by an external electrical signal in order to switch the switch valve.

2. An air spring for a two-wheeled vehicle as defined in claim 1, wherein the switch valve and a throttle are provided in series in the passage.

3. An air spring for a two-wheeled vehicle, the air spring being disposed between a vehicle body and a vehicle wheel, comprising a piston which slides in a cylinder member;

a rod member which is engaged with the piston;

a rod-side air chamber and a piston-side air chamber which are partitioned in the cylinder member by the piston and are filled with compressed air;

a passage which connects the two air chambers;

a switch valve which opens and closes the passage, the switch valve being provided in the piston;

an actuator which operates the switch valve being mounted inside the rod member, the actuator being operated by an external electrical signal in order to switch the switch valve;

a sensor which detects a state of strain in a drive chain of the two-wheeled vehicle; and a controller which inputs a drive signal to the actuator based on a sensor signal in order to switch the switch valve.

4. An air spring for a two-wheeled vehicle, the air spring being disposed between a vehicle body and a vehicle wheel, comprising:

a piston which slides in a cylinder member, the cylinder member being an outer tube which supports the vehicle wheel of the two-wheeled vehicle;

a rod member which is engaged with the piston, the rod member being an inner tube which is connected to the vehicle body, the piston being connected to the inner tube;

a passage provided in the piston, the piston connecting an inner tube air chamber with an outer tube air chamber, the inner tube air chamber and the outer tube air chamber being partitioned in the cylinder member by the piston and being filled with compressed air;

a switch valve which opens and closes the passage provided in the piston; and an actuator which switches the switch valve mounted on the inner tube, wherein the switch valve has a connecting position which places the passage in a connecting state, and a cut-off position which places the passage in a cut-off position, a check valve which allows a flow of air from the inner tube air chamber to the outer tube air chamber being inserted into the cut-off position.

5. An air spring for a two-wheeled vehicle, the air spring being disposed between a vehicle body and a vehicle wheel, comprising:

a piston which slides in a cylinder member;

a rod member which is engaged with the piston;

a rod-side air chamber and a piston-side air chamber which are partitioned in the cylinder member by the piston and are filled with compressed air;

a passage which connects the two air chambers;

a switch valve which opens and closes the passage;

wherein the switch valve has a connecting position which places the passage in a connecting state, and a cut-off position which places the passage in a cut-off state, the cut-off position having a check valve inserted therein, the check valve allowing a flow of air from the rod-side chamber to the piston-side chamber;

a sensor which detects a state of strain in a drive chain of the two-wheeled vehicle; and a controller which inputs a drive signal to an actuator based on a sensor signal in order to switch the switch valve.

6. An air spring for a two-wheeled vehicle, the air spring being disposed between a vehicle body and a vehicle wheel, comprising:

a piston which slides in a cylinder member, the cylinder member being an outer tube which supports the vehicle wheel of the two-wheeled vehicle;

a rod member which is engaged with the piston, the rod member being an inner tube which is connected to the vehicle body, the piston being connected to the inner tube;

a passage provided in the piston, the piston connecting an inner tube air chamber with an outer tube air chamber, the inner tube air chamber and the outer tube air chamber being partitioned in the cylinder member by the piston and being filled with compressed air;

a switch valve which opens and closes the passage provided in the piston; and an actuator which switches the switch valve mounted on the inner tube;

wherein the switch valve is a check valve which only allows a flow of air from the inner tube air chamber to the outer tube air chamber; and the actuator is operated by an external electrical signal and when in operation forcibly opens the check valve.

* * * * *